United States Patent [19]

Bekele

[11] Patent Number: 4,909,726

[45] Date of Patent: Mar. 20, 1990

[54] IMPACT-RESISTANT FILM FOR CHUB PACKAGING

[75] Inventor: Solomon Bekele, Taylors, S.C.

[73] Assignee: Grumman Aerospace Corporation, Bethpage, N.Y.

[21] Appl. No.: 241,539

[22] Filed: Sep. 6, 1988

Related U.S. Application Data

[63] Continuation-in-part of Ser. No. 173,224, Mar. 24, 1988, abandoned.

[51] Int. Cl.⁴ .................. B32B 27/00; B32B 27/08
[52] U.S. Cl. .................... 428/34.3; 428/349; 428/475.8; 428/476.9; 428/516; 428/520
[58] Field of Search .............. 428/332, 475.8, 476.9, 428/516, 34.3, 520, 349; 264/176.1, 514

[56] References Cited

U.S. PATENT DOCUMENTS

| | | | |
|---|---|---|---|
| 3,223,761 | 12/1965 | Raley | 264/514 |
| 3,926,706 | 12/1975 | Reifenhäuser et al. | 156/229 |
| 4,386,124 | 5/1983 | Akao | 428/35 |
| 4,477,532 | 10/1984 | Schmukler et al. | 428/441 |

Primary Examiner—P. C. Ives
Attorney, Agent, or Firm—Scully, Scott, Murphy & Presser

[57] ABSTRACT

A multilayer film useful in chub packaging includes a heat sealable layer, an abuse layer of very low density polyethylene, a polyamide or copolyamide layer, an oxygen barrier layer, a layer comprising nylon 6 or nucleated nylon 6, and a self-weldable layer.

An alternate construction can be made without the abuse layer of very low density polyethylene, and includes an additional self-weldable layer. The film is made of a double-wound lay-flat tubular film. The film exhibits excellent impact resistant properties.

19 Claims, 2 Drawing Sheets

IMPACT-RESISTANT FILM FOR CHUB PACKAGING

This application is a continuation-in-part of U.S. Pat. Ser. No. 173,224, filed Mar. 24, 1988 now abandoned.

BACKGROUND OF THE INVENTION

This invention relates generally to a coextruded film suitable for packaging, and more particularly to a hot blown film suitable for use in chub packaging and having improved impact resistance, interlaminar bond strength and seal strength properties.

Certain foods, and particularly meat products such as ground beef and other comminuted food substances, are commonly packaged in what are called chub packages. These packages are generally produced at central processing plants operated by supermarket chains or meat packing companies. These packages are generally produced using a vertical form fill seal (VFFS) process, in which a tube is formed from a flat sheet of roll stock film. The tube is formed vertically and longitudinally sealed with a vertical sealing bar. The bottom of the tube is then sealed with a clip applied to the bottom of the tube, the meat product such as ground beef is pumped into the open end of the tube, and the top is sealed with a clip to produce the final chub package. In appearance, these chubs resemble semi-rigid tubes with the tubular film forming a skin tight layer around the food product.

Package sizes may range from 1 to 20 pounds, depending on the intended mode of distribution. Pumping equipment typically used to stuff the food product into the tubular film can place great stress on the longitudinal seal of the tube. This longitudinal seal is usually a lap seal.

More recently, crust-frozen items have become more popular, and the hardening of the outer surface of the food product in the tubular casing during the freezing process can produce further stress on the longitudinal seal.

Successful films for use in such applications include the HS660 and HS2000 films produced commercially by the Cryovac Division of W. R. Grace and Co. The films are composed of lay-flat tubular film. Prior to collapse, the HS660 film includes an inner layer of ethylene vinyl acetate copolymer (EVA) and an outer layer of polyethylene (PE). The two core layers comprise nylon, with an intermediate layer between each nylon layer and respective outer layer and inner layers comprising ionomer resins. In the case of HS2000, an ethylene vinyl alcohol copolymer replaces the nylon layer closest to the inside of the structure.

While such materials have been very useful in producing chub packaging, it is an object of the present invention to further improve the performance of chub packaging materials, especially under conditions where improved seal strength, impact resistance, and interlaminar bond strength are desirable.

SUMMARY OF THE INVENTION

In one aspect of the present invention, a multilayer hot blown film useful in chub packaging comprises an outer heat sealable layer selected from the group consisting of ethylene alpha-olefin copolymer, fractional melt index low density polyethylene, and ethylene ester copolymer; an abuse layer bonded to said heat sealable layer and comprising an abuse resistant polymeric material; a first bonding layer disposed between and bonding the abuse layer to a first intermediate layer, said bonding layer comprising a polymeric adhesive; a first intermediate layer comprising a copolyamide or nylon 6; a core layer bonded to said first intermediate layer, comprising an ethylene vinyl alcohol copolymer; a second intermediate layer bonded to said core layer, and comprising a copolyamide, nylon 6 or nucleated nylon 6; and a second bonding layer bonded to the second intermediate layer, and comprising a self-weldable polymeric adhesive; wherein the film is a lay-flat film having its self-weldable layers bonded together.

In another aspect of the present invention, a method of making a multilayer thermoplastic film useful in chub packaging comprises producing a first melt stream of a heat sealable material selected from the group consisting of ethylene alpha-olefin copolymer, fractional melt index low density polyethylene, and ethylene ester copolymer, a second melt stream of an abuse-resistant polymeric material, a third melt stream of a polymeric adhesive, a fourth melt stream of a copolyamide or nylon 6, a fifth melt stream of an ethylene vinyl alcohol copolymer, a sixth melt stream of a copolyamide, nylon 6 or nucleated nylon 6, and a seventh melt stream of a self-weldable polymeric adhesive; coextruding the melt streams through an annular die to form a tubular film; hot blowing the coextruded tubular film; cooling the hot blown film; and collapsing the cooled film to form a lay-flat tubular film.

In yet another aspect of the present invention, a multilayer hot blown film useful in chub packaging comprises an outer heat sealable layer selected from the group consisting of ethylene alpha-olefin copolymer, fractional melt index low density polyethylene and ethylene ester copolymer; a first bonding layer disposed between and bonding the outer heat sealable layer to a first intermediate layer, said bonding layer comprising a polymeric adhesive; a first intermediate layer comprising a copolyamide or nylon 6; a core layer bonded to said first intermediate layer, and comprising an ethylene vinyl alcohol copolymer; a second intermediate layer bonded to said core layer, and comprising a copolyamide, nylon 6 or nucleated nylon 6; a second bonding layer disposed between and bonding the second intermediate layer to a self-weldable layer, and comprising a polymeric adhesive; and a self-weldable layer comprising an ethylene ester copolymer; wherein the film is a lay-flat film having its self-weldable layers bonded together.

In still another aspect of the present invention, a method of making a multilayer thermoplastic film useful in chub packaging comprises producing a first melt stream of a heat sealable polymeric material selected from the group consisting of ethylene alpha-olefin copolymer, fractional melt index low density polyethylene, and ethylene ester copolymer, a second melt stream of a polymeric adhesive, a third melt stream of a copolyamide or nylon 6, a fourth melt stream of an ethylene vinyl alcohol copolymer, a fifth melt stream of a copolyamide, nylon 6 or nucleated nylon 6, a sixth melt stream of a polymeric adhesive, and a seventh melt stream of a self-weldable ethylene ester copolymer; coextruding the melt streams through an annular die to form a tubular film; hot blowing the coextruded tubular film; cooling the hot blown film; and collapsing the cooled film to form a lay-flat tubular film.

BRIEF DESCRIPTION OF THE DRAWINGS

The invention may be further understood by reference to the attached drawings wherein.

DETAILED DESCRIPTION OF THE PREFERRED EMBODIMENT

Figure 1:
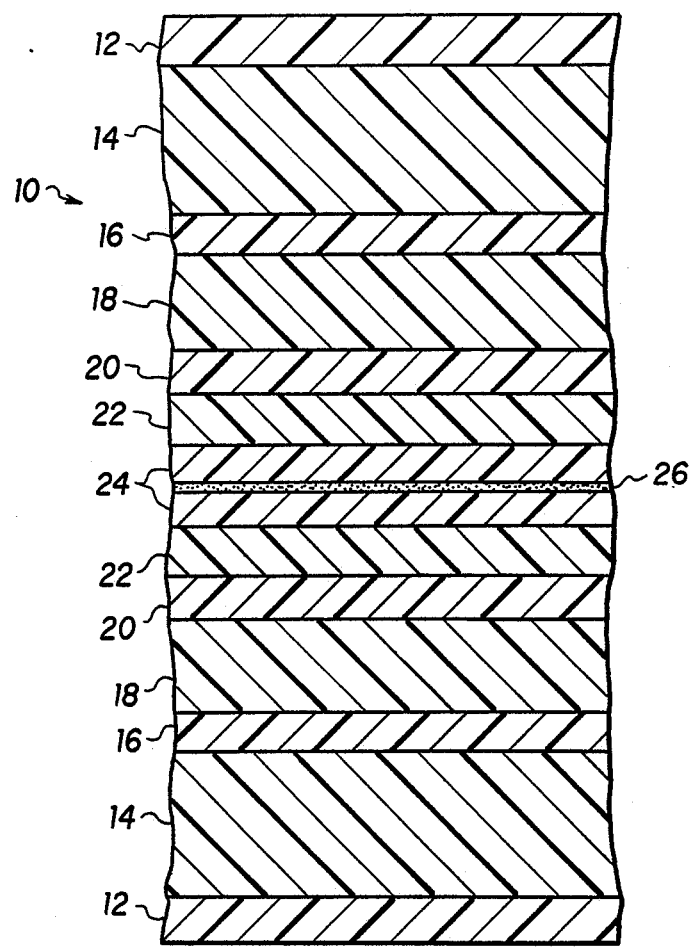
FIG. 1 is a schematic cross-section of a double wound, lay-flat tubular film according to a preferred embodiment of the present invention.

Referring to FIG. 1, a hot blown film 10 includes a heat sealable layer 12 comprising an ethylene ester copolymer, and more preferably an ethylene vinyl acetate copolymer (EVA), even more preferably an EVA with between about 4% and 6% by weight of vinyl acetate comonomer. An especially preferred resin for layer 12 is a 5½% vinyl acetate content EVA with a melt index of about 0.45, available from Exxon under the trade designation Escorene XS 81.54. Other suitable materials for layer 12 include ethylene alpha-olefin copolymer and fraction melt index low density polyethylene. Especially preferred ethylene alpha-olefin copolymers are linear low density polyethylenes such as Dowlex 3010 having a density of 0.921 grams per cubic centimeter and Exxon LL 3003.37 having a density of 0.917 gms/cc, and very low density polyethylene such as Attane 4001, 4002, and 4003. These latter materials have a density of about 0.912 grams per cubic centimeter (for 4001 and 4002) and 0.905 grams per cubic centimeter (for 4003).

Layer 14 functions to improve the abuse resistance of the package, and also contributes to the impact resistance of a chub package. This layer is preferably made up of a very low density polyethylene (VLDPE), and especially a VLDPE having a density ranging from between about 0.900 and 0.912 grams per cubic centimeter. A suitable resin for layer 14 is Attane 4003 available from Dow. This particular resin has a density of about 0.905 grams per cubic centimeter, and a melt index of about 0.80 grams per ten minutes at standard ASTM conditions.

Another suitable material for layer 14 is an ethylene vinyl acetate copolymer with a fractional melt index (i.e. a melt index of less than about 1.0 grams/ten minutes) and a vinyl acetate content of at least about 12%. One such resin is Exxon 705.16, with a melt index of about 0.35 grams/10 minutes and a vinyl acetate content of about 12% by weight.

Ionomers such as those available from du Pont under the Surlyn trademark, comprising metal-salt neutralized ethylene acrylic or methacrylic acid copolymers, are also suitable for layer 14.

In addition to the contribution to the impact resistance and abuse resistance of the final package, layer 14 can be used to carry a pigment in a pigmented film. For example, a white pigment containing titanium dioxide can be included in layer 14, so that the pigment will not have to be included in heat sealable layer 12. A preferable material is Ampacet PE 11853 which contains 50% TiO$_2$ and 50% LLDPE. This results in an improvement in the sealing properties of layer 12 compared with a heat seal layer having pigment.

In the event that the film is to be printed, this technique and construction also provides for better printability of layer 12, because the pigment can often interfere with the printability of the film if included in its outer heat sealable layer.

A first bonding layer 16 is disposed between and bonds abuse layer 14 and a first intermediate layer to be discussed in more detail below. This layer 16 may comprise any of the chemically modified polyolefins available in the market place which will provide sufficient interlaminar bond strength between layers 14 and 18. An especially preferred resin for layer 16 is a modified ethylene vinyl acetate copolymer, the EVA having a vinyl acetate content of about 9% by weight, and a melt index of about 1. A suitable resin is available from Quantam under the designation Plexar 108. Another suitable resin is Bynel 3095 or 333, both available from du Pont.

Various additives such as slip agents can be added to the heat sealable material of layer 12 in minor amounts, for example between about 5 and 10%, sufficient to provide the machinability or other desired properties depending on the end use of the packaging material, and the particular equipment in which the packaging material of the present invention will be used. In particular, a blend of about 90% low density polyethylene and about 10% coloidal silica may be used as an effective slip agent.

A first intermediate layer 18 is adhered to a surface of adhesive layer 16, and also adhered to core layer 20. This layer preferably comprises a copolyamide. The most preferred copolyamide for layer 16 is nylon 6/66 such as Ultramid C 35, a copolymer of nylon 6 and nylon 66 available from BASF. This material has been found to be particularly useful in providing abuse resistance and high impact resistance. Another useful resin is Xtraform 1590 available from Allied. Other copolyamides useful in layer 16 include nylon 6/69 and nylon 6/12. Resins of the former type can be obtained from Custom Resins as Custom 826. Nylon 6/12 can be obtained from Emser as CA 6 or CR 9 respectively. These commercial resins are given by way of example only. Nylon 6 can also be used in layer 18.

The core layer 20 comprises an ethylene vinyl alcohol copolymer (EVOH). Suitable EVOH resins are available from EVALCA and vary in ethylene content. EVOH resins with higher ethylene contents, especially those having at least about 38% ethylene are preferred because of the greater flexibility of such material. One particularly suitable resin is EVAL H 101 with an ethylene content of about 38 mole percent.

On the surface of the core layer opposite the first intermediate layer is the second intermediate layer 22 comprising a copolyamide, nylon 6 or nucleated nylon 6. An especially preferred nylon 6 is available from Allied and designated Capron 8209 F. Another resin is Ultramid B4 from BASF. Where dimensional stability is a desired property in a chub package, an especially preferred nylon 6 is a nucleated nylon 6 such as BASF 602 U. Nucleated nylon 6 is believed to have a small amount of a nucleating agent such as talc, which serves to set up nucleating sites in the resin around which more consistently sized crystallites grow. This in turn contributes to improved package tightness and dimensional stability and helps to prevent bulging of the chub package.

A second bonding layer 24 represents a self-weldable layer preferably comprising the same material as that used in layer 16, although different chemically modified polymeric adhesives could be used for layers 16 and 24 respectively. The important property of the composition of layer 22 is that, when the tubular film is collapsed layer 22 will self-weld to itself.

Interface 26 represents the point of contact between self-weldable layers 24 when the tubular film is collapsed.

Figure 2:
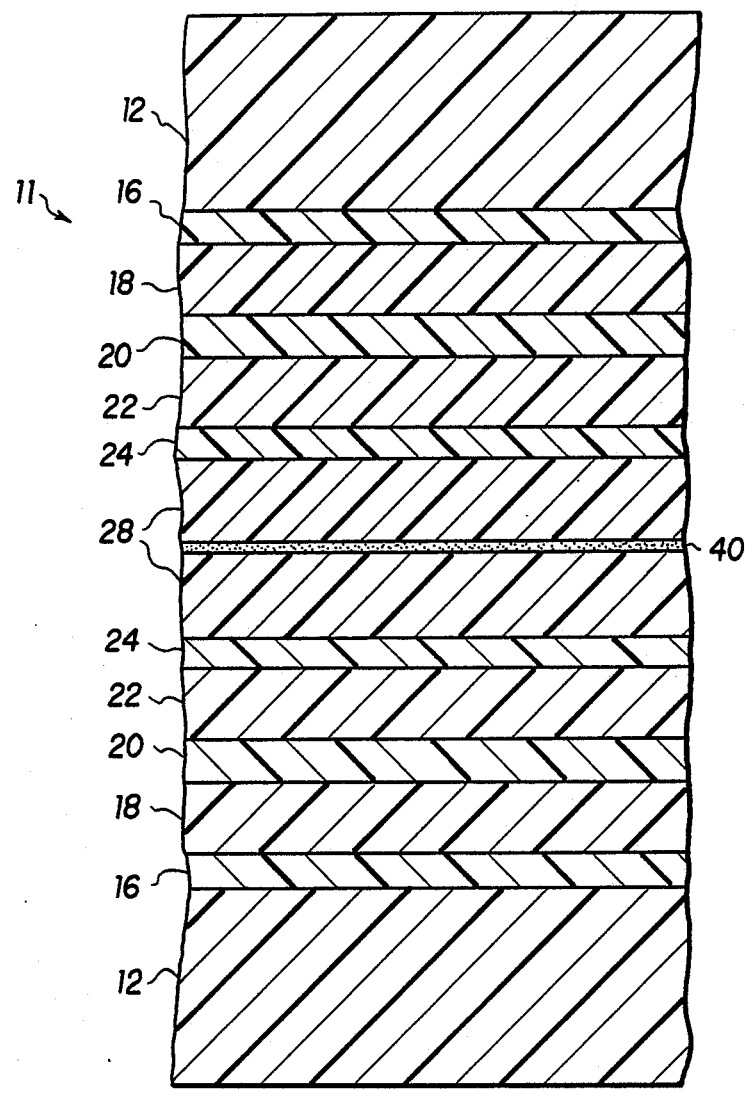
FIG. 2 is a schematic cross-section of a double wound, lay-flat tubular film according to another embodiment of the present invention.

FIG. 2 represents a less preferred embodiment as film 11. The core layer 20 and first and second intermediate layers 18 and 22 are substantially identical to like referenced layers in FIG. 1. Layer gauges may differ, as described more thoroughly hereinafter. Bonding layers 16 and 24 correspond to like numbered layers in FIG. 1.

Layer 28 of FIG. 2 represents the self-weldable layer preferably comprising ethylene vinyl acetate copolymer, and more preferably an EVA with between about 10 and 14% vinyl acetate comonomer. Most preferably, an EVA of about 12% vinyl acetate content is used. A suitable resin for this layer is Escorene XS 74.16. This layer 28 will self-weld to itself at interface 40 when the tubular film of FIG. 2 is collapsed. Thus, layer 28 of FIG. 2 functions in substantially the same way as layer 24 of FIG. 1.

Bonding layer 16 of FIG. 2 is bonded directly to heat sealable layer 12, without an intervening abuse layer 14 such as appears in FIG. 1.

In a process for producing these films, melt streams for each of the resins of layers 12 through 24 of FIG. 1 or layers 12 through 28 of FIG. 2, are produced and coextruded through an annular die to form a tubular die. The film is hot blown by techniques well known in the art. Thereafter the hot blown film is cooled and then collapsed to form a layflat tubular film. Thus, the self-weldable material of layer 24 (FIG. 1) or layer 28 (FIG. 2) is welded to itself at the interior collapsed interface of the film.

The invention may be further understood by reference to the examples of films produced in accordance with the invention.

EXAMPLE 1

An ethylene vinyl alcohol copolymer (EVAL H 101) was extruded through a first extruder at extrusion temperature zones ranging from 425° F. to 450° F.

A polymeric adhesive (Plexar 108) was extruded through a second extruder as a split stream at a temperature of about 450° F.

A very low density polyethylene (Attane 4003) having a density of about 0.905 grams per cubic centimeter, and a melt index of about 0.80 grams/10 minutes, was extruded through a third extruder at a temperature of about 475° F.

A nylon 6/66 copolyamide (Ultramid C 35) was passed through a fourth extruder at a temperature of about 500° F.

A polyamide, nylon 6 (Capron 8209F) was extruded through a fifth extruder at a temperature of about 500° F.

About 90% of an EVA (Escorene 311.54) having a vinyl acetate content of about 4.5% and a melt index of about 0.35 grams/ten minutes, was blended with about 10% of an antiblocking agent. This agent was a blend of about 90% low density polyethylene (Dow PE 722) having a density of about 0.916 grams/cubic centimeter and a melt index of about 8 grams/ten minutes, and about 10% of a colloidal silica (Syloid 378).

The blend was passed through a sixth extruder at a temperature of about 450° F.

The Plexar 108 polymeric adhesive described earlier in this Example was extruded through a seventh extruder at extruder temperature zones ranging from 400° F. to 430° F.

The various resin melt streams were coextruded through an annular coextrusion die, and the tubular film was hot blown, cooled, and collapsed to form a double-wound lay-flat film 44 inches wide welded together at its adhesive interface.

Layer gauge in mils for the film of Example 1 was as follows (values would be doubled to represent the final double-wound film):

EVA +Antiblock/VLDPE/Adhesive/Copolyamide/EVOH/Nylon 6/Adhesive/
.10    .31  .08   .20   09   .10  .08

EXAMPLE 2

A multilayer film substantially like that of Example 1 was produced, but utilizing a polyamide, nylon 6 (Capron 8209 F) in place of the copolyamide.

The film structure of Example 2 would thus be as follows:

EVA+Antiblock/VLDPE/Adhesive/Nylon 6/EVOH/Nylon 6/Adhesive/

EXAMPLE 3

A multilayer film substantially like that of Example 1 was produced, but utilizing an ethylene vinyl acetate copolymer (Exxon 705.16) in place of the very low density polyethylene. The EVA had a vinyl acetate content of 12% by weight, and a melt index of 0.35 grams/ten minutes.

Thus, the film structure for Example 3 may be depicted as follows:

$EVA_1$+Antiblock/$EVA_2$/Adhesive/Copolyamide/EVOH/Nylon 6/Adhesive/

EXAMPLE 4

A nylon 6/66 copolyamide (Ultramid C 35) was passed through a first extruder at extruder temperature zones ranging from 475° F. to 500° F.

An ethylene vinyl acetate copolymer (Escorene XS-574.16) (Exxon) having a vinyl acetate content of about 12% and a melt index of about 1.0, was extruded through a second extruder at extruder temperature zones ranging from about 425° F. to 450° F.

A polymeric adhesive (Plexar 108) having an EVA base with a 9% vinyl acetate content was extruded through a third extruder at extrusion temperature zones ranging from 340° F. to 375° F.

An ethylene vinyl alcohol copolymer (EVAL H 101) with an ethylene content of about 38 mole percent was extruded through a fourth extruder at extrusion temperature zones ranging from 425° F. to 450° F.

A polymeric adhesive (Plexar 108) as described above was extruded through a fifth extruder at extrusion temperature zones ranging from 375° F. to 400° F.

About 90% of an ethylene vinyl acetate copolymer (EVA) (Escorene 311.54), having a vinyl acetate content of about 4.5% and a melt index of about 0.35 grams/ten minutes, was blended with about 10% of an antiblocking agent as described earlier for Example 1.

This blend was passed through a sixth extruder at extruder temperature zones ranging from 350° F. to 375° F.

A nylon 6/66 copolyamide (Ultramid C 35) was passed through a seventh extruder at extruder temperature zones ranging from 500° F. to 530° F.

The final structure of the coextruded film, processed as described in claim 1, was as follows:

EVA+Antiblock/Adhesive/-
Copolyamide/EVOH/Copolyamide/Adhesive/EVA/

EXAMPLE 5

A multilayer film substantially like that of Example 4 was produced, but utilizing nucleated nylon 6 (BASF 602 U), in place of the copolyamide layer farthest from the blend layer.

Thus, the film structure for Example 5 is as follows:

EVA+Antiblock/Adhesive/-
Copolyamide/EVOH/Nucleated nylon 6/Adhesive/EVA/

EXAMPLE 6

A multilayer film substantially like that of Example 1 was produced, but utilizing a polyamide, nylon 6 (Capron 8207 F) in place of the copolyamide farthest from the blend layer. The film structure for Example 6 was as follows:

EVA+Antiblock/Adhesive/-
Copolyamide/EVOH/Nylon 6/Adhesive/EVA/

One important characteristic of films of the present invention is their high impact resistance. This property is very important when handling chub packages, and during transportation and distribution of such packages.

Samples of each of the films described in Examples 1 through 6 were made into test chub packages on a KP model 50 VFFS machine.

One 13½" roll of each of the films of Examples 1, 2, 3, 4, and 6 were supplied for testing. One 19" roll each of Examples 1 through 6, as well as a longitudinally oriented version of the film of Example 5 were also supplied for testing.

Ten pounds of Terra Sorb, a polymeric moisture-absorbent material, were packaged in the 13½" materials, and 21 pounds of Terra Sorb were packaged in the 19" materials.

During packaging of the 10 pound chubs, 25 packages were produced from the outer portion of the film rolls, and 25 additional packages were produced after cutting approximately 2" into the rolls. A total of 50 chubs were therefore produced with each of the materials of Examples 1, 2, 3, 4, and 6.

Prior to packaging the 21 pound chubs, about 2" of film was cut from the rolls of each of the film types. Subsequently, 25 chubs of Terra Sorb were produced with each test material.

For each packaging test, HS2000 film was used as a control.

All chubs were drop tested from a height of approximately 6 feet and failure rates were recorded. Machine conditions used to produce both package sizes on the KP 50 machine were as follows:

|  | 10 Pound | 20 Pound |
|---|---|---|
| Variac | 75 | 65 |
| Film Speed | 3.6 | 2.58 |
| Clutch Brake | 4.67 | 9.04 |
| Voider | 5.58 | 9.41 |
| Voider Dwell | 1.76 | 2.3 |
| Pump Speed |  | 9.0 |

Drop test results are tabulated in Table I below.

TABLE 1
Drop Test Results of 10 Pound and 20 Pound Chubs of Terra Sorb

| Control | 10 lb. (%) 16/50 (32) | 20 lb. (%) 0/25 | Comments |
|---|---|---|---|
| Example 1 |  |  |  |
| Outer | 0/25 | 0/25 | Bad creases initially. |
| Inner | 0/25 |  | Internal layers less |
| Total | 0/50 |  | creased. Chubs soft. |
| Example 2 |  |  |  |
| Outer | 0/25 | 0/25 | Bad creases initially. |
| Inner | 0/25 |  | Chubs not as soft as |
| Total | 0/50 |  | others. Also less stretchy. Not as stiff as HS2000. 19" fairly baggy. |
| Example 3 |  |  |  |
| Outer | 0/25 | 1/25 (4) | Swirls & gels present. |
| Inner | 0/25 |  | Some creases. Slight |
| Total | 0/50 |  | brake caused sealing problems. Prone to clip cuts. Chubs soft. |
| Example 4 |  |  |  |
| Outer | 0/20 | 0/25 | Many gels and carbon |
| Inner | 11/30 (37) |  | fragments very stretchy |
| Total | 11/50 (22) |  | Could use only minimum brake. Chubs were soft. Film fairly flat. Reduced seal heat. |
| Example 5 |  |  |  |
|  |  | 0/25 | Numerous very large carbon fragments. Very stretchy. |
| Example 6 |  |  |  |
| Outer | 0/25 | 0/25 | Fewer gels than Example |
| Inner | 0/25 |  | 4. |
| Total | 0/50 |  | Very stretchy. Chubs soft. Fairly flat. |

The longitudinally oriented version of Example 5 showed the same results as the film of Example 5.

All six films of Examples 1 through 6 required lower sealing temperatures than the HS2000 control film. Previous test results indicated that structures with Escorene 311.54 as the sealant required slightly more seal heat, but this is believed to be attributable to the presence of 10% by weight of antiblock in the films of Examples 1 through 6, compared with 5% antiblock in previous film samples.

With the exception of the control film and the film of Example 2, all test structures were very stretchy. The chubs exhibited a soft feel, and finger indentations were left in the film as the chubs were handled. This stretchiness contributed to some machining problems due to film necking down the back of the film folder on the machine particularly in the case of the 19" film. Nearly all break tension was removed to run these films.

The 10 pound chubs were produced without difficulty, and the chubs were uniformly shaped. The control film and the film of Example 2 were firmer and easier to handle.

Some bulging occurred in the 20 pound chubs with all of the films except for Example 2 and the control film, which exhibited little or no bulging.

EXAMPLE 7

A multilayer film substantially like that of the film of Example 3 was produced, but utilizing the same EVA resin for the abuse layer as is utilized in the heat sealable outer layer. The film structure of Example 7 would thus be as follows:

$EVA_1$+Antiblock/$EVA_1$/Adhesive/-Copolyamide/EVOH/Nylon 6/Adhesive/

This film failed in five drop tests at a height of 4 feet, using 20 pound chubs, and also failed at a height of 2 feet.

This film did not perform as well as the film of Example 3. It is believed that the EVA of the abuse layer should have a fractional melt index (i.e. a melt index of less than 1.0 grams/ten minutes) as well as a vinyl acetate content of at least about 12% by weight, to provide improved performance in the final package.

EXAMPLE 8

A multilayer film like that of Example 5 was produced, having the following construction and layer gauge (mils):

EVA + Antiblock/Adhesive/Copolyamide/EVOH/Nucleated Nylon 6/Adhesive/EVA//
                    0.15                         0.15         .10  .20

The film was characterized by stiffness, clarity, and adequate seals, but split without stretching during testing of 5 samples at a height of 4 feet using 20 pound chubs.

EXAMPLE 9

A multilayer film was produced substantially like that of Example 4, but with a blend of 95% EVA and 5% antiblock in the heat-sealable layer. In drop tests of 20 pound chubs at 4 feet, all 12 samples survived the drop test without rupturing. At a 6 foot elevation, out of 25 samples, only 4 ruptured during the drop test.

The films of the present invention are useful in applications where chubs such as ground beef chubs are crust frozen after the package is made.

One roll (2000 feet) of the film of Example 9 was tested on a KP model 50 packaging machine. Thirteen pound coarse ground beef chubs were made and then conveyed into a glycol chiller and were crust frozen to a depth of about ¾". Machine conditions used for producing the chubs were as follows:

| Film Speed | 1.60 |
| --- | --- |
| Variac Setting | 1.15 |
| Sealing Air Pressure | 100 psi |
| Cooling Air Pressure | 50 psi |

The film exhibited good film flatness and machined well, and the chubs were induced to bulge during the clipping and discharge steps due to poor timing of the clipper head and interference with a rail during discharge. Seal strength was superior to that of HS2000 film.

The chubs produced with this film survived the freezing process with no evidence of herniations, splitting, or delamination.

EXAMPLE 10

A multilayer film substantially like that of Example 8 was produced, but with the following construction and layer gauges:

EVA + Antiblock/Adhesive/Copolyamide/EVOH/Nucleated Nylon 6/Adhesive/EVA/
                    0.20                       10         .05  .10

This film survived all five drop tests at heights of 4 feet and 6 feet (20 pound chubs), although one chub split down the center of the longitudinal seal due to overheating. In a second test series, the film also survived 15 of 16 drop tests at a height of 4 feet, and 10 of 15 drop tests at a height of 6 feet.

A comparison of Examples 8 and 10 show that the impact resistance of the film of Example 8 was poor, but the impact resistance of the film of Example 10 was excellent. The difference in performance appears to be attributable to differences in pertinent layer gauges for these films.

In the film of Example 10, the amount (layer gauge) of the copolyamide was increased, while the amount (layer gauge) of nucleated nylon 6 was decreased. Thus, the relatively flexible copolyamide layer contributed to the flexibility, and impact resistance, of the overall film.

In addition, the amount (layer gauges) of the innermost adhesive layer, and the self-weldable layer were reduced. It is believed that this reduction permits better moisturization of the nucleated nylon 6 from the contents of the chub package. This would make the nucleated nylon 6 more flexible, and contribute further to improve impact resistance.

The drop tests discussed above were conducted at room temperature. In packaging for example ground beef chubs, the product is generally at a temperature of about 40° F. Thus, in practice the colder product encountered in the field will be somewhat more demanding on film performance than the room temperature simulations.

A countervailing consideration is that when actual meat product is packaged, the packaging material is moisturized to some extent and made more flexible by the contained meat product, e.g. ground meat. In particular, moisturization of a nylon 6 or nucleated nylon 6 layer by the internal meat product can serve to improve impact resistance. An additional consideration is that chubs which are clipped at their ends in a typical vertical form fill seal arrangement are typically dropped at an angle onto a conveyor belt after clipping. In this sense, the simulated tests are more rigorous than actual field conditions. As discussed earlier, in the preferred embodiment of the invention, the abuse layer may be used to carry pigment in a pigmented version of the film, and this has advantages in terms of heat sealability and printability of the film. Two examples given below demonstrate films made using pigment in the abuse layer.

EXAMPLE 11

A multilayer film like that of Example 2 was made, but with the abuse layer comprising a blend 70% VLDPE and 30% Ampacet PE 11853. This material is commercially available and comprises a blend of 50% linear low density polyethylene of two melt index, and 50% titanium dioxide.

The film was produced and processed substantially like the film of Example 2.

The film construction is as follows:

EVA+Antiblock/VLDPE+Pigment/Adhesive/-
Nylon 6/EVOH/Nylon 6/Adhesive/

EXAMPLE 12

A multilayer film like that of Example 11 was produced, but having a copolyamide (Ultramid C 35) in place of the Nylon 6 layer closest to the heat sealable outer layer. The film construction was as follows:

EVA+Antiblock/VLDPE+Pigment/Adhesive/-
Copolyamide/EVOH/Nylon 6/Adhesive/

EXAMPLE 13

A multilayer film is made substantially like that of the preceding examples and has the following construction:

EVA+Antiblock/Ionomer/Adhesive/-
Copolyamide/EVOH/Nylon 6/Adhesive/

EXAMPLE 14

A multilayer film is made substantially like that of the preceding examples and has the following layer construction:

EVA+Antiblock/Ionomer/Adhesive/-
Copolyamide/EVOH/Copolyamide/Adhesive/

The films described in Examples 1 through 3 were tested to examine the energy absorbing capability for these films compared with the HS2000 film described earlier. It is believed that this capability is a measure of the abuse resistance and impact resistance of these materials. As indicated in Table 2 below, the tensile strength at yield, modulus, tensile strength at break, total energy to break (Dart drop) and ball burst impact all point to higher energy requirements to deform the films of the present invention than the comparative film. In addition, these films prove to be more ductile than the comparative film.

TABLE 2

|  | Example 1 | Example 2 | Example 3 | Comparative Example |
|---|---|---|---|---|
| Tensile at Break and 73° F. (PSI)[1] | | | | |
| Av.[2] Long | 83.4 × 100 | 77.3 × 100 | 85.2 × 100 | 71.2 × 100 |
| Std. Dev. | 3.5 × 100 | 9.7 × 100 | 4.5 × 100 | 1.3 × 100 |
| 95% C.L.[3] | 5.6 × 100 | 15.4 × 100 | 7.2 × 100 | 2.1 × 100 |
| Av. Trans. | 68.4 × 100 | 69.5 × 100 | 76.4 × 100 | 64.7 × 100 |
| Std. Dev. | 4.0 × 100 | 2.5 × 100 | 7.3 × 100 | 3.1 × 100 |
| 95% C.L. | 6.3 × 100 | 3.9 × 100 | 11.6 × 100 | 5.0 × 100 |
| Gauge Long.[4] | 2.46 | 2.25 | 2.16 | 1.89 |
| Std. Dev. | 0.11 | 0.06 | 0.09 | 0.06 |
| 95% C.L. | 0.17 | 0.10 | 0.14 | 0.10 |
| Gauge Trans. | 2.33 | 2.39 | 1.99 | 1.95 |
| Std. Dev. | 0.02 | 0.01 | 0.05 | 0.04 |
| 95% C.L. | 0.03 | 0.02 | 0.07 | 0.06 |
| Tensile at Yield and 73° F. (PSI)[1] | | | | |
| Av.[2] Long | 28.9 × 100 | 28.7 × 100 | 28.8 × 100 | 33.5 × 100 |
| Std. Dev. | 0.8 × 100 | 2.4 × 100 | 1.0 × 100 | 1.2 × 100 |
| 95% C.L.[3] | 1.2 × 100 | 3.8 × 100 | 1.6 × 100 | 2.0 × 100 |
| Av. Trans. | 26.3 × 100 | 27.0 × 100 | 30.2 × 100 | 32.3 × 100 |
| Std. Dev. | 0.6 × 100 | 0.1 × 100 | 0.8 × 100 | 0.4 × 100 |
| 95% C.L. | 1.0 × 100 | 0.2 × 100 | 1.3 × 100 | 0.7 × 100 |
| Gauge Long.[4] | 2.46 | 2.25 | 2.16 | 1.89 |
| Std. Dev. | 0.11 | 0.06 | 0.09 | 0.06 |
| 95% C.L. | 0.17 | 0.10 | 0.14 | 0.10 |
| Gauge Trans. | 2.33 | 16.4 | 1.99 | 1.95 |
| Std. Dev. | 0.02 | 1.2 | 0.05 | 0.04 |
| 95% C.L. | 0.03 | 1.9 | 0.07 | 0.06 |
| Modulus at 73° F. (PSI)[5] | | | | |
| Av. Long. | 62.4 × 1000 | 62.0 × 1000 | 66.1 × 1000 | 84.8 × 1000 |
| Std. Dev. | 6.9 × 1000 | 1.9 × 1000 | 4.3 × 1000 | 3.0 × 1000 |
| 95% C.L. | 11.0 × 1000 | 3.0 × 1000 | 6.9 × 1000 | 4.7 × 1000 |
| Av. Trans. | 68.1 × 1000 | 72.1 × 1000 | 64.7 × 1000 | 80.7 × 000 |
| Std. Dev. | 1.5 × 1000 | 4.9 × 1000 | 4.0 × 1000 | 1.7 × 1000 |
| 95% C.L. | 2.4 × 1000 | 7.9 × 1000 | 6.4 × 1000 | 2.7 × 1000 |
| Gauge Long. | 2.38 | 2.15 | 2.20 | 1.94 |
| Std. Dev. | 0.08 | 0.04 | 0.08 | 0.12 |
| 95% C.L. | 0.12 | 0.06 | 0.13 | 0.20 |
| Gauge Trans. | 2.37 | 2.37 | 2.18 | 1.95 |
| Std. Dev. | 0.02 | 0.04 | 0.12 | 0.04 |

TABLE 2-continued

| | Example 1 | Example 2 | Example 3 | Comparative Example |
|---|---|---|---|---|
| 95% C.L. | 0.04 | 0.06 | 0.20 | 0.06 |
| Total Energy to Break @ 73° F. (PSI)[6] | | | | |
| Av. Long. | 4767.6 | 4122.8 | 4720.8 | 3901.1 |
| Std. Dev. | 322.1 | 703.0 | 411.4 | 166.3 |
| 95% C.L. | 512.4 | 1118.5 | 654.5 | 264.6 |
| Av. Trans. | 4254.7 | 4210.0 | 4511.1 | 4028.9 |
| Std. Dev. | 278.8 | 211.1 | 518.9 | 221.5 |
| 95% C.L. | 443.6 | 335.9 | 825.6 | 352.4 |
| Gauge Long. | 2.46 | 2.25 | 2.16 | 1.89 |
| Std. Dev. | 0.11 | 0.06 | 0.09 | 0.06 |
| 95% C.L. | 0.17 | 0.10 | 0.14 | 0.10 |
| Gauge Trans. | 2.33 | 2.39 | 1.99 | 1.95 |
| Std. Dev. | 0.02 | 0.01 | 0.05 | 0.04 |
| 95% C.L. | 0.03 | 0.02 | 0.07 | 0.06 |
| Ball Burst Impact at 20° F. 1.00 In. Diam. Sphere Hd., (cm × kg)[7] | | | | |
| Average | 16.1 | 15.5 | 17.3 | 12.3 |
| Std. Dev. | 2.7 | 1.6 | 2.7 | 1.5 |
| 95% C.L. | 4.3 | 2.5 | 4.4 | 2.3 |
| Gauge | 2.33 | 2.27 | 2.17 | 1.96 |
| Std. Dev. | 0.09 | 0.05 | 0.11 | 0.10 |
| 95% C.L. | 0.05 | 0.02 | 0.06 | 0.05 |
| Ball Burst Impact At 40° F. 1.00 In. Diam. Sphere Hd., (cm × kg) | | | | |
| Average | 17.7 | 17.6 | 18.3 | 11.8 |
| Std. Dev. | 0.3 | 1.2 | 4.7 | 1.6 |
| 95% C.L. | 0.5 | 1.9 | 7.5 | 2.5 |
| Gauge | 2.35 | 2.13 | 2.13 | 1.95 |
| Std. Dev. | 0.16 | 0.07 | 0.07 | 0.09 |
| 95% C.L. | 0.09 | 0.04 | 0.04 | 0.05 |

The following footnotes applies to Table 2.
1. ASTM D882-81.
2. All average values in Table 2 are averages obtained from four (4) replicate measurements.
3. C.L. is Confidence Limit—for example, in a reported average value of 10 with a 95% C.L. of 2, in 100 replicate readings, 95 would have a value between 8 and 12 inclusive.
4. Gauge measured in mils. Values listed are for corresponding examples.
5. ASTM D882-81.
6. ASTM D882-81.
7. ASTM D3420-80.

The Examples given above are given by way of illustration only. Various modifications will become evident to those skilled in the art after a review of the specification. These modifications are deemed to be within the scope of the invention as claimed below.

What is claimed is:

1. A multilayer hot blown film useful in chub packaging comprising:
   (a) an outer heat-sealable layer comprising a polymeric material selected from the group consisting of ethylene alpha-olefin copolymer, fractional melt index low density polyethylene, and an ethylene ester copolymer;
   (b) an abuse layer bonded to said heat-sealable layer and comprising an abuse-resistant polymeric material selected from the group consisting of very low density polyethylene, ethylene vinyl acetate copolymer with a fractional melt index, and ionomer;
   (c) a first bonding layer disposed between and bonding the abuse layer to a first intermediate layer, said bonding layer comprising a chemically modified polyolefinic adhesive;
   (d) a first intermediate layer comprising a copolyamide or nylon 6;
   (e) a core layer bonded to said first intermediate layer comprising an ethylene vinyl alcohol copolymer;
   (f) a second intermediate layer bonded to said core layer, and comprising a copolyamide, nylon 6 or nucleated nylon 6; and
   (g) a second bonding layer bonded to the second intermediate- layer comprising a self-weldable chemically modified polyolefinic adhesive; wherein the film is a lay-flat film having its self-weldable layers bonded together.

2. A multilayer hot blown film according to claim 1 wherein the heat-sealable ethylene ester copolymer comprises an ethylene vinyl acetate copolymer.

3. A multilayer hot blown film according to claim 2 wherein the ethylene vinyl acetate copolymer has a vinyl acetate content of between about 4% and 6% by weight.

4. A multilayer hot blown film according to claim 1 wherein the heat sealable ethylene alpha-olefin copolymer comprises a linear low density polyethylene or very low density polyethylene.

5. A multilayer hot blown film according to claim 1 wherein the first and second bonding layers comprise an ethylene vinyl acetate copolymer based chemically modified adhesive.

6. A multilayer hot blown film according to claim 1 wherein the first intermediate layer comprises a copolyamide selected from the group consisting of:
   (i) nylon 6/12

(ii) nylon 6/66
(iii) nylon 6/69.

7. A multilayer hot blown film according to claim 1 wherein the ethylene vinyl alcohol copolymer has an ethylene content of at least about 38 mole percent.

8. A chub package made from the film of claim 1.

9. A multilayer hot blown film useful in chub packaging comprising:
   (a) an outer heat sealable layer comprising a polymeric material selected from the group consisting of ethylene alpha-olefin copolymer, fractional melt index low density polyethylene, and an ethylene ester copolymer;
   (b) a first bonding layer disposed between and bonding the heat sealable layer to a first intermediate layer, said bonding layer comprising a chemically modified polyolefinic adhesive;
   (c) a first intermediate layer comprising nylon 6;
   (d) a core layer bonded to said first intermediate layer and comprising ethylene vinyl alcohol copolymer;
   (e) a second intermediate layer bonded to said core layer and comprising a copolyamide, nylon 6 or nucleated nylon 6;
   (f) a second bonding layer disposed between and bonding the second intermediate layer to a self-weldable layer, and comprising a chemically modified polyolefinic adhesive; and
   (g) a self-weldable layer comprising an ethylene ester copolymer.

10. A multilayer hot blown film according to claim 9 wherein the outer heat sealable ethylene ester copolymer comprises an ethylene vinyl acetate copolymer.

11. A multilayer hot blown film according to claim 10 wherein the ethylene vinyl acetate copolymer has a vinyl acetate content of between about 3% and 6% by weight.

12. A multilayer hot blown film according to claim 9 wherein the ethylene alpha-olefin copolymer is selected from the group consisting of linear low density polyethylene and very low density polyethylene.

13. A multilayer hot blown film according to claim 9 wherein the first bonding layer comprises an ethylene vinyl acetate copolymer based chemically modified adhesive.

14. A multilayer hot blown film according to claim 9 wherein the first intermediate layer comprises a copolyamide selected from the group consisting of:
(i) nylon 6/12
(ii) nylon 6/66
(iii) nylon 6/69.

15. A multilayer hot blown film according to claim 9 wherein the ethylene vinyl alcohol copolymer has an ethylene content of at least about 38 mole percent.

16. A multilayer hot blown film according to claim 9 wherein the second bonding layer comprises an ethylene vinyl acetate copolymer based chemically modified adhesive.

17. A multilayer hot blown film according to claim 9 wherein the self-weldable ethylene ester copolymer comprises an ethylene vinyl acetate copolymer.

18. A multilayer hot blown film according to claim 17 wherein the ethylene vinyl acetate copolymer has a vinyl acetate content of between about 10% and 14%.

19. A chub package made from the film of claim 9.

* * * * *

UNITED STATES PATENT AND TRADEMARK OFFICE
CERTIFICATE OF CORRECTION

PATENT NO. : 4,909,726

DATED : March 20, 1990

INVENTOR(S) : Solomon Bekele

It is certified that error appears in the above-identified patent and that said Letters Patent is hereby corrected as shown below:

On the cover page - (73) Assignee: delete "Grumman Aerospace Corporation, Bethpage, N.Y., substituting therefor --W. R. Grace & Co.-Conn., Duncan, S.C.--

Also Attorney, Agent, or Firm: delete "Scully, Scott, Murphy & Presser", substituting therefor --John J. Toney; William D. Lee, Jr.; Mark B. Quatt--

Signed and Sealed this

Tenth Day of December, 1991

*Attest:*

HARRY F. MANBECK, JR.

*Attesting Officer*     *Commissioner of Patents and Trademarks*